Figure 1:
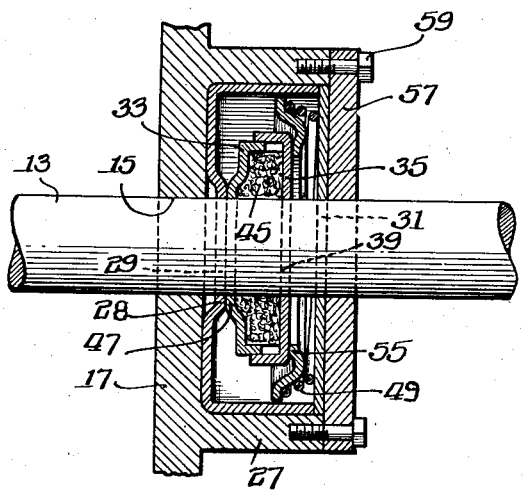

June 6, 1939.     G. P. GILMAN     2,161,672
SEAL FOR ROTATING SHAFTS
Filed Sept. 28, 1936

Inventor:-
George P. Gilman
By: Cox & Moore, attys.

Patented June 6, 1939

2,161,672

UNITED STATES PATENT OFFICE 2,161,672

SEAL FOR ROTATING SHAFTS

George P. Gilman, Chicago, Ill., assignor to Rotary Seal Co., Chicago, Ill., a corporation of Illinois Application September 28, 1936, Serial No. 102,877

4 Claims. (Cl. 286—7)

My invention relates in general to seals and sealing and has more particular reference to the sealing of rotating shafts in order to prevent the escape of fluids along the shaft past a wall or journal through which it extends.

An important object of the present invention is to provide a self-contained seal device comprising sealing elements assembled in a shell or casing whereby the same may be merchandised as an integrated unit ready for assembly as a unit in sealing position on the shaft.

Another important object is to provide a seal of inexpensive construction, the invention to this end contemplating the fabrication of metallic seal parts entirely formed of sheet metal parts of relatively simple configuration.

Another important object is to provide a shaft seal formed and assembled as a complete integrated unit ready for assembly on the shaft and enclosed in a casing in which may be loaded or charged a lubricating medium in quantities sufficient to supply adequate lubrication to the seal throughout the normal life thereof so that the device requires no attention whatsoever as long as it is in service.

Another important object is to provide a self-lubricating seal.

These and numerous other important objects, advantages, and inherent functions of the invention will be fully understood as the same becomes apparent from the following description, which, taken in connection with the accompanying drawing, discloses a preferred embodiment of the invention.

Figure 2:
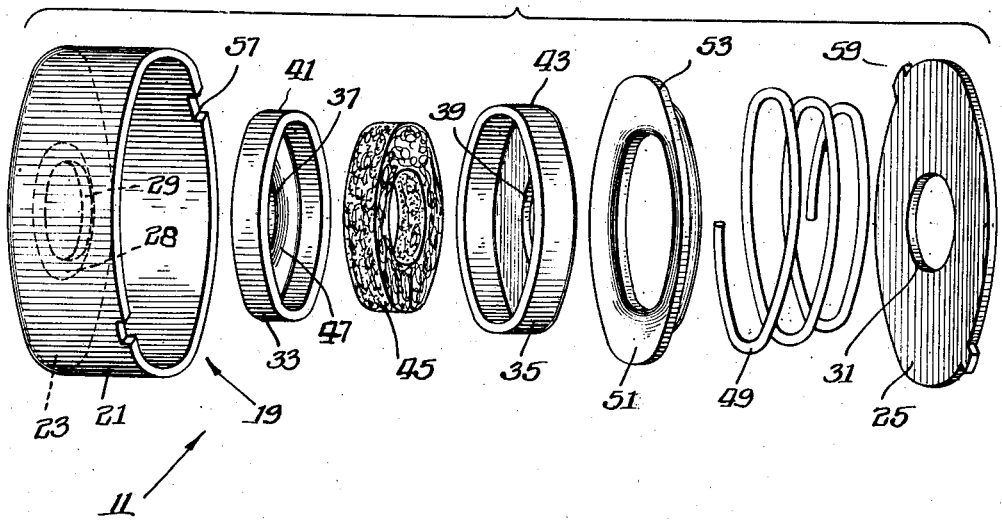

Referring to the drawing:

Figure 1 is a sectional view taken through a seal embodying the present invention, the seal being shown assembled in operating position on a rotatable shaft; and Figure 2 is a perspective view of the seal forming the parts shown in relatively exploded position.

To illustrate the invention, I have shown on the drawing a shaft seal 11 for use on a shaft 13 for sealing the same against leakage along the shaft through the opening 15 in a wall 17 through which the shaft extends.

The seal comprises elements assembled and housed within a cup element 19 having preferably cylindrical side walls 21 and an end wall 23 forming the bottom of the cup-shaped element, the other end being open. A cover 25 may be provided for closing the open end of the shell 19.

The shell, of course, may be of any suitable or convenient size and I prefer to form the same to fit preferably snugly within a pocket formed by an annular ridge 27 on the wall 17 through which the shaft extends, said ridge or wall 27 encircling the shaft to provide an annular pocket therearound into which the seal may be assembled. The end wall 23 of the shell 19 is preferably provided with an inward embossment 28 defining an opening 29 through which the shaft 13 may extend and the cover 25 is likewise formed with an opening 31 for receiving the shaft. Within the housing formed by the shell 19 and the cover 25 is assembled a plurality of seal elements including a pair of cooperating shells 33 and 35, said shells comprising preferably annular cups having openings 37 and 39 centrally of their bottoms for receiving the shaft and having interfitting flanges 41 and 43 disposed at the marginal edges of said elements whereby when the same are assembled they form an expansible housing for receiving a resilient packing ring 45. This packing ring 45 may comprise any suitable packing material, but I prefer to utilize a rubber-like material, such as Duprene, the same comprising a synthetic rubber. The packing ring 45 is formed to fit snugly within the housing formed by the cooperating elements 33 and 35 and the element 33 is formed with an embossment 47 at the opening 37, said embossment 47 being adapted to ride upon and form riding contact with the embossment 28 of the casing element 19.

Means is provided within the casing element 19 for resiliently pressing the shells 33 and 35 towards each other and upon the packing ring 45 whereby the material of the ring is compressed by and between the elements 33 and 35. In the illustrated embodiment this compressing function is accomplished by means of a spring 49 and a bearing washer 51, the peripheral edges of which comprise a flange 53 for receiving one end of the spring 49 and the inner edges of which are curled as at 55 to bear upon the outer surfaces of the element 35 near the margin thereof. The opposite end of the spring 49, of course, engages the cover 25 which, after the elements of the seal have been assembled in the shell 19 is applied and secured on the open end thereof.

The cover 25 may be secured to the casing element 19 in any suitable or preferred manner and I have shown the shell element 19 formed with notches 57 adapted to receive lugs or ears 59 formed on the cover whereby to prevent relative rotation of the cover on the shell. To secure the cover in place, the edges defining the open end of the shell element may be peened over upon the cover or said edges may be welded, soldered, or otherwise secured to the abutting edges of the cover element.

It will be seen that the spring 49 functions to press the shell elements 33 and 35 together, causing the flanges 41 and 43 to interfit, and compressing the packing material 45 between the shell elements. The shell elements, however, comprise an expansible casing and the spring has sufficient resilience to maintain compression on the packing as the same becomes worn in order to snugly press the packing upon the shaft on which the seal is assembled. The spring 49 also serves to press the embossed portion 47 of the shell element 33 upon the corresponding embossment 27 of the casing element 19 whereby to maintain a running seal between said parts.

The seal comprises an assembled unit and may be sold or delivered as such to the user. The seal may be assembled simply by forcing the same on to the shaft and sliding it along the shaft axially into the socket provided by the walls 27. Thereupon a cover plate 57 may be applied to the edges of the annular wall 27 and secured in place in any suitable fashion, as by means of the screws 59 in order to hold the seal unit in mounted position. The assembly operation may, of course, be facilitated by lubricating the inner face of the packing ring 45 but after the seal has been assembled, the action of the spring is such as to press the ring snugly upon the shaft and to form driving connection between the shaft and the ring which thereafter during the life of the seal will rotate with the shaft. Spring 49 also ensures that the elements 33 and 35 will also rotate with the shaft. The shell element 19 and the cover 25, however, because of the extensive superficial engagement thereof with the surfaces of the wall 17 and the cover 57 and also with the annular wall 27 will be held against rotation. The spring 49 and the ring 51 may also remain stationary so that the seals 33 and 35 and the packing ring rotate between to form running connection with the embossments 27 and 55.

The seal of my present invention may also be charged with a quantity of lubricant by filling the casing 21 with a lubricating medium. To this end the casing 19 may be filled with oil through the opening 31 before the unit is assembled on the shaft. This will not only assist in the assemblage operation by wetting the inner surfaces of the packing ring 45 thereby enabling the same to slip more freely along the shaft during the mounting operation, but after the unit is in place the oil will be retained substantially within the casing and may not escape through the opening 29. Some of the oil may, of course, escape through the opening 31 and outwardly along the shaft, but a sufficient quantity of lubricating medium may be retained within the casing 19 to constitute the device as a self-lubricating seal substantially throughout its entire service life. The presence of oil not only improves the sealing effect, but also serves to reduce wear between the shell elements 33 and 35 and the embossed portions 27 and 55.

The seal of my present invention is neat and compact and may be sold or delivered to the customer for assembly as a unit in a shaft. The seal construction is inexpensive since the casing elements 19 and 25, the shell elements 33 and 35, and the pressure ring 51 may all be formed from simple sheet metal stampings while the spring 49 is an inexpensive, standard element.

It is thought that the invention and its numerous attendant advantages will be fully understood from the foregoing description, and it is obvious that numerous changes may be made in the form, construction, and arrangement of its several parts without departing from the spirit and scope of my invention or sacrificing its attendant advantages, the form herein described being a preferred embodiment for the purpose of illustrating the invention.

What I claim is new and desire to secure by Letters Patent of the United States is:

1. A seal for rotating shafts comprising sheet metal means embossed to form an annular seat, a cooperating pair of cup-shaped members forming an expansible housing, at least one of said cup-shaped members being of sheet metal and having an embossment forming an annular bearing adapted to engage said seat, packing material within said expansible housing, and resilient means operatively associated with said housing to urge the same toward said seat whereby said bearing may form a running fit on said seat, said resilient means operating also to compress the cup-shaped members whereby to squeeze the packing material therebetween.

2. A seal as set forth in claim 1, wherein said means forming the annular seat comprises also a casing for enclosing the expansible housing and the resilient means to form a self-contained seal unit, said seat being formed in a wall of said casing, and said resilient means being operatively positioned to exert a pressure between one of said cup-shaped members and a wall of said casing opposite said seat.

3. A seal as set forth in claim 1, including a thrust ring in position receiving the thrust of said resilient means and bearing on one of the members forming said expansible housing whereby to transfer to said rotating housing the thrust of the stationary resilient means.

4. A seal as set forth in claim 1, wherein the resilient means comprises a coiled spring, a thrust ring in position receiving the thrust of said spring and bearing upon one of the members forming said housing whereby to transfer to said rotating housing the thrust of the stationary spring.

GEORGE P. GILMAN.